Sept. 10, 1929.   O. V. KRUSE   1,727,548
VALVE
Filed May 12, 1926
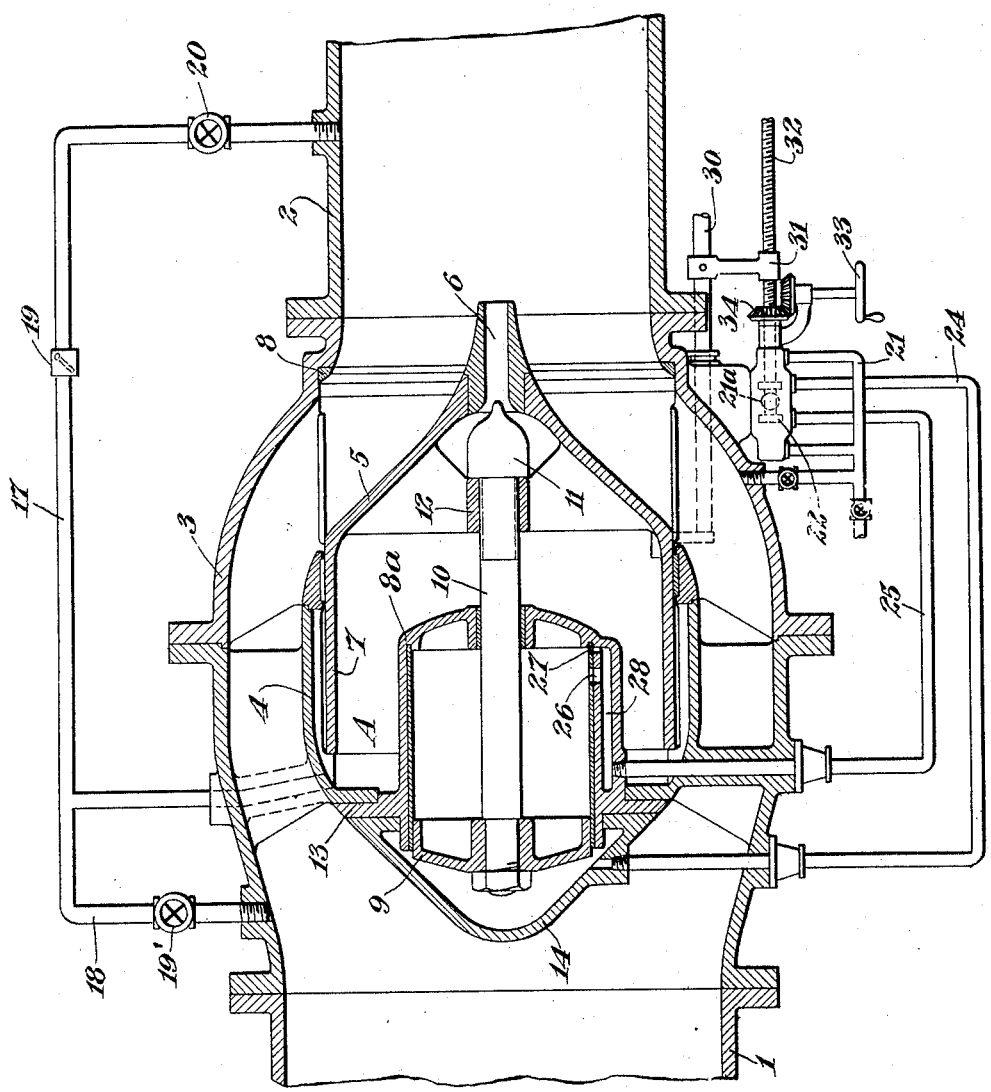
Inventor
Otto V. Kruse
By his Attorneys Patented Sept. 10, 1929.

1,727,548

UNITED STATES PATENT OFFICE.

OTTO V. KRUSE, OF ST. DAVIDS, PENNSYLVANIA, ASSIGNOR, BY MESNE ASSIGNMENTS, TO I. P. MORRIS CORPORATION, A CORPORATION OF DELAWARE.

VALVE.

Application filed May 12, 1926. Serial No. 108,469.

This invention relates to valve mechanisms and more particularly to the type having a fluid controlled plunger.

It is an object of my invention to provide an improved arrangement of fluid controlling elements, which arrangement is particularly adapted to be effective during the final closing stroke of the plunger. A further object is to provide an improved arrangement of elements whereby the plunger may move at a relatively fast rate during initial closing movement, and will then be automatically retarded during the final movement. Another object is to provide a valve which will close at a substantially uniform rate irrespective of pressure conditions in the pipe beyond the valve. In this respect the plunger, while hydraulically operated, is not permitted to change appreciably its rate of stroke, even though a complete loss of pressure in the pipe beyond the valve at some point in the stroke would tend to cause such an acceleration. A still further object is to provide such an arrangement that even though the plunger is retarded during the final closing movement yet there will be sufficient fluid pressure for closing the plunger.

The foregoing and other objects of my invention will be apparent from the following description of the accompanying drawing, which is a sectional view of the valve mechanism with certain auxiliary elements shown in elevation.

In the illustrative embodiment of my invention I have shown interposed between up and downstream pipes 1 and 2 a valve mechanism having an outer casing 3 and an inner casing 4 spaced therefrom by suitable ribs so as to provide a smooth, substantially annular shaped fluid passage. The casing 4 slidably carries a plunger 5 having a passage 6 in the nose thereof, and an annular guiding portion 7. To control the plunger and move the same relative to the valve seat 8 there is provided, separate from the plunger 5, a cylinder 8ᵃ having a piston 9 disposed therein. A piston rod 10 carries a valve 11, which is adapted to control the passage 6 or to abut a collar 12 fixed to the plunger 5. The cylinder 8ᵃ is supported as by a flange 13, preferably annular, while the outer end of the cylinder is closed by an upstream casing member 14. The flange 13 and member 14 may be secured to the casing 4 in any well-known manner, such as cap screws or the like. This construction permits, in addition to other features, the ready inspection of the piston and cylinder or the removal thereof without in any way dismantling the plunger 5.

A control pipe 17 allows communication between the downstream pipe 2 and the chamber A formed by the plunger and casing 4, while an auxiliary supply pipe 18 which has a throttle valve 19' disposed therein allows communication between the upstream pipe 1 and chamber A. A check valve 19 prevents fluid flow from the chamber A, while a hand valve 20 may be used to close off or otherwise adjust fluid flow relative to pipe 17.

To control fluid flow relative to the cylinder 8ᵃ there is provided a supply pipe 21 having communication with opposite ends of a chamber, within which a balanced cylindrical control valve 22 is disposed. Pipes 24 and 25 lead respectively from the valve chamber to the up and down stream sides of the cylinder 8ᵃ. A suitable exhaust port 21ᵃ leading downward is provided in the valve chamber to allow exhaust of pressure from either end of the cylinder 8ᵃ through pipes 24 and 25. Cylinder 8ᵃ is provided with an enlarged port 26 and a restricted port 27, both communicating with a common passage 28, within which the pipe 25 terminates. The port 26 allows relatively free movement of the fluid, while the port 27 will, in addition to the piping system first described, retard final closing movement of the plunger.

To effect closing, opening or different throttling positions of the plunger there is provided a rod 30 positively connected to the plunger 5 and extending through a suitable packing in the casing 3. This rod carries an arm having a nut 31 connected to a screw 32 by usual screw threads. The screw 32 is connected to the valve 22 for longitudinal movement in opposite directions, while the screw is rotated by a hand wheel 33 and bevel gears 34, one of which is splined to the screw 32.

In the operation to close the valve the operator will rotate the screw 32, which due to its cooperation with the nut 31 will cause movement of valve 22 in a left hand direction to permit supply of fluid from pipe 21 to the pipe 24 and to connect the pipe 25 with the exhaust port. This valve mechanism is well-known. Also the supply fluid may come from either the pipe line or from a suitable exterior source. This pressure would cause movement of piston 9, and accordingly close the passage 6. Pressure acting on the piston 9 and the pressure within the chamber A, which flows through pipes 17 and 18 will cause closing movement of the plunger. As the plunger moves the screw 32 is moved in a right hand direction also, thereby causing the screw to slide through the bevel gear and restore the valve 22 to its neutral position, thereby holding the piston 9 stationary. This would effect a given throttle position of the plunger, but should it be desired to close the plunger entirely the operator continuously rotates the hand wheel 33 to maintain valve 22 in a left hand open position. Fluid flow in the pipes 24 and 25 could, of course, be controlled by any suitable valve mechanism, but in any case when the plunger approaches its seat pressure in the downstream pipe 2 will drop materially while pressure in the upstream pipe 1 will remain substantially normal. The result is that when the plunger 5 reaches this closing point in its stroke there is a tendency for the plunger to move away from the pilot valve 11, thus opening up the orifice in the nose of the plunger and relieving pressure in the chamber A to correspond with the low pressure created beyond the plunger by the plunger approaching its closed position. The same drop in pressure renders pipe 17, due to check valve 19, ineffective for relieving pressure in chamber A thereby holding sufficient pressure in chamber A to complete the closing stroke. During this latter part of the closing stroke the plunger is like a free discharge valve in that the pressure from the chamber A is exhausted through the orifice 6, and pressure is also admitted to the chamber A through the fit around the plunger and the pipe 18. During the initial closing movement of plunger 5 fluid can flow from the down stream pipe 2 through pipe 17 to chamber A thereby to keep the pressure in chamber A substanially the same as in the down stream pipe.

The restoring mechanism has the advantage of assisting and controlling the plunger during its transition from operation in dead water to operation under free discharge conditions. The tendency of the plunger during final closing is to move away from the pilot valve, open up the orifice 6 and tend to reverse the setting of the control valve 22 with the effect that a reverse action of the piston 9 will further open the plunger orifice. Hence a very rapid and effective opening of the orifice 6 is accomplished. The opening of the orifice need be very little as it only has to take care of the water or fluid coming through the leakage space, together with what small amount might be admitted through the pipe 18. At the end of the closing stroke a dash-pot action will be had due to the covering of port 26. In addition to this dash-pot action the plunger enters an annular machined surface adjacent the seat so that practically all of the water passage is cut off while the plunger is still some little distance from its seat. To hold the plunger shut the valve 11 will be moved forwardly to close the orifice 6.

To open the plunger, proper reverse manipulation of handwheel 33 would cause the orifice 6 to be opened to discharge pressure from the chamber A, which with the aid of pressure in the downstream side of cylinder 8 would permit opening movement of the plunger.

The closing of the valve can be accomplished with pipe 17 closed off entirely and supplying pressure only through pipe 18 and through the leakage space; or with pipe 18 closed off entirely and supplying pressure through pipe 17 for the initial closure and through the leakage space only for the final closure; or with the combination of the three sources of pressure supply.

I claim:

1. The combination with a valve mechanism having an outer casing and an inner casing within which a plunger is telescopically arranged to provide a fluid chamber, a plunger seat, a valve controlled port in said plunger, and piston and cylinder elements for controlling said port valve mechanism, of a pipe allowing communication between said chamber and the downstream side of the valve adjacent the valve seat, means for controlling fluid pressure in said cylinder element, and means adapted automatically to prevent fluid flow through said pipe when said plunger is in its final closing movement.

2. The combination with a valve mechanism having a plunger, means forming therewith a fluid operating chamber, and a valve seat, of means permitting communication between said chamber and the downstream side of the valve mechanism adjacent the valve seat, and means adapted automatically to prevent said communication when said plunger is in its final closing movement.

3. The combination with a valve mechanism having a casing, a plunger cooperating therewith to form a fluid chamber, a valve controlled port in said plunger, and means for controlling said port valve, of means for allowing communication between said chamber and a part of the pipe line in which the valve mechanism is disposable, and means adapted automatically to prevent said communication when said plunger is in its final closing movement.

4. The combination with a valve mechanism having a casing and a plunger cooperating therewith to form a fluid chamber, a valve controlled port in said plunger, and means forming a seat for the plunger, of means for allowing communication between the chamber and the pipe line beyond said seat but adjacent thereto, means for closing said port to effect initial closing movement of the plunger, means for controlling said port whereby the same is adapted to open automatically when the plunger is in its final closing movement, and means for automatically preventing fluid flow from said chamber when said port is so opened to said downstream pipe.

5. The combination with a valve mechanism having a casing and a plunger cooperating therewith to form a fluid chamber, a valve controlled port in said plunger, means forming a seat for the plunger, of means for allowing communication between the chamber and the pipe line beyond said seat but adjacent thereto, means for closing said port to effect initial closing movement of the plunger, means for controlling said port whereby the same is adapted to open automatically when the plunger is in its final closing movement, means for automatically preventing fluid flow from said chamber to said downstream pipe when said port is so opened, and means for permitting supply of fluid to said chamber during said final closing plunger movement.

6. The combination with a valve mechanism comprising inner and outer casings, a plunger having telescopic relation with the inner casing to form a fluid chamber, and a seat for the plunger formed on the outer casing, of a pipe extending to the exterior of said casings and adapted to allow communication between the downstream side of the valve mechanism adjacent the valve seat and said chamber, and means for preventing fluid flow from the chamber through said exterior pipe to the downstream pipe.

7. The combination with a valve mechanism having inner and outer casings concentrically spaced to form a smooth fluid passageway, a plunger having telescopic relation with said inner casing to form a fluid chamber, a seat for said plunger formed on said outer casing, said plunger having a port in the nose thereof, a valve for controlling said port, piston and cylinder elements disposed in said chamber but separate from said plunger, one of said elements being movable, means for connecting said movable element to said valve, and means for controlling fluid flow to said cylinder element, of a pipe extending to the exterior of said casings and allowing communication between said chamber and the pipe line adjacent the valve seat, and a check valve disposed in said exterior pipe to prevent fluid flow therethrough from the chamber to the pipe line.

8. The combination with a valve mechanism of the plunger type having a valve mechanism in the plunger, and piston and cylinder elements disposed substantially within the outer limits of said plunger for controlling said valve, of restoring mechanism associated with said plunger and said piston and cylinder elements whereby when said plunger tends to move so as to open said plunger valve mechanism said restoring mechanism will be actuated so as to cause said piston to increase the rate of opening movement of said plunger valve mechanism.

9. The combination with a valve mechanism having a plunger, means forming therewith a fluid operating chamber, and a valve seat, of means permitting communication between said chamber and the downstream side of the valve mechanism adjacent the valve seat including a passage, and means for automatically preventing communication through said passage in response to a drop in pressure below normal at the downstream side of the valve.

10. The combination with a valve mechanism having a plunger, means forming therewith a fluid operating chamber, and a valve seat, of means extending to the exterior of said mechanism for permitting communication between said chamber and the downstream side of the valve mechanism adjacent the valve seat, and means for automatically preventing communication through said exterior means in response to a drop in pressure below normal at the downstream side of the valve.

11. In combination, a valve mechanism of the plunger type having a pilot valve in the plunger, a restoring mechanism associated with said plunger, and means whereby when said plunger moves in a closing direction, said pilot valve may be opened and said restoring mechanism actuated so as to cause the rate of opening of said pilot valve to increase.

12. In combination, a valve mechanism of the plunger type having a passage in the nose thereof adapted to permit communication between the interior and exterior of said plunger, piston and cylinder elements disposed substantially within the outer limits of the plunger and connected thereto by a piston rod, and a restoring mechanism associated with said plunger and said piston and cylinder elements whereby when said plunger tends to move at a rate in excess of a predetermined value said restoring mechanism is actuated to control fluid flow to said cylinder and thereby control the rate of movement of said plunger.

13. In combination, a valve mechanism of the plunger type, piston and cylinder elements, one of which is connected to said plunger by a rod, a restoring mechanism also associated with said plunger and said piston and cylinder elements whereby when said plunger tends to move at a rate in excess of a predetermined value said restoring mechanism is actuated to control fluid flow to said cylinder and thereby control the rate of movement of said plunger, said rod connection including a lost motion connection.

14. In combination, a valve mechanism having a plunger and means cooperating therewith to form a fluid chamber, means forming a valve seat, a pipe permitting communication between said chamber and the downstream side of the valve mechanism adjacent said seat, and a check valve in said pipe for preventing flow of fluid from said chamber when pressure in the downstream side of the plunger drops below normal.

15. In combination, a valve mechanism comprising a plunger, means cooperating therewith to form a fluid chamber, means forming a passage leading from said chamber to the upstream side of said plunger, means forming a passage leading from within said plunger to the down stream side of said plunger, and a check valve disposed in said latter passage adapted to prevent fluid flow from said chamber to said pipe.

OTTO V. KRUSE.